United States Patent
Ohara

(10) Patent No.: US 10,313,577 B2
(45) Date of Patent: Jun. 4, 2019

(54) FOCUS DETECTION APPARATUS, FOCUS DETECTION METHOD, AND IMAGE CAPTURING APPARATUS

(71) Applicant: CANON KABUSHIKI KAISHA, Tokyo (JP)

(72) Inventor: Naoyuki Ohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 15/410,027

(22) Filed: Jan. 19, 2017

(65) Prior Publication Data

US 2017/0214845 A1    Jul. 27, 2017

(30) Foreign Application Priority Data

Jan. 21, 2016  (JP) ................................. 2016-009979

(51) Int. Cl.
*H04N 5/232*    (2006.01)
*G06T 7/00*    (2017.01)

(52) U.S. Cl.
CPC ....... *H04N 5/23212* (2013.01); *G06T 7/0002* (2013.01); *G06T 2207/20021* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 4,716,434 A * | 12/1987 | Taniguchi | ........... | G02B 7/34 250/201.8 |
| 4,768,054 A * | 8/1988 | Norita | ........... | G02B 7/34 396/104 |
| 4,882,601 A * | 11/1989 | Taniguchi | ........... | G02B 7/34 396/104 |
| 5,130,735 A * | 7/1992 | Kusaka | ........... | G02B 7/34 396/104 |
| 5,216,460 A * | 6/1993 | Yoshimura | ........... | G02B 7/32 396/123 |
| 5,404,192 A * | 4/1995 | Konishi | ........... | G02B 7/28 396/123 |

(Continued)

FOREIGN PATENT DOCUMENTS

JP    2011-247938 A    12/2011
JP    2014-032214 A    2/2014

*Primary Examiner* — William B Perkey
(74) *Attorney, Agent, or Firm* — Cowan, Liebowitz & Latman, P.C.

(57) ABSTRACT

A focus detection apparatus that performs phase difference focus detection using signals output from focus detection pixels each having first and second photoelectric portions that share one microlens, comprises: a setting unit that sets a focus detection area; a detection unit that detects whether a position and/or a size of a subject in an image has changed; a division unit that divides the focus detection area into a plurality of divisional areas by a divisor that is smaller when the detection result yields true than when it yields false; and a focus detection unit that adds signals respectively for the first and second photoelectric portions included in each divisional area in the divisional direction and obtains correlation amounts between the added signals, and adds the obtained correlation amounts for each focus detection area, then performs the focus detection.

15 Claims, 11 Drawing Sheets

(56) References Cited

U.S. PATENT DOCUMENTS

| | | | | |
|---|---|---|---|---|
| 5,659,812 A * | 8/1997 | Uchiyama | ............... | G02B 7/34 396/104 |
| 6,522,394 B2 * | 2/2003 | Ichimiya | ............... | G01C 3/085 356/3.06 |
| 6,700,651 B2 * | 3/2004 | Taka | ............... | G01C 3/08 356/3.14 |
| 8,107,806 B2 * | 1/2012 | Uenishi | ............... | G02B 7/102 250/201.2 |
| 2015/0256737 A1 * | 9/2015 | Saito | ............... | H04N 5/23212 348/349 |
| 2016/0353005 A1 * | 12/2016 | Kaibara | ............... | H04N 5/23212 |
| 2017/0214845 A1 * | 7/2017 | Ohara | ............... | H04N 5/23212 |

* cited by examiner

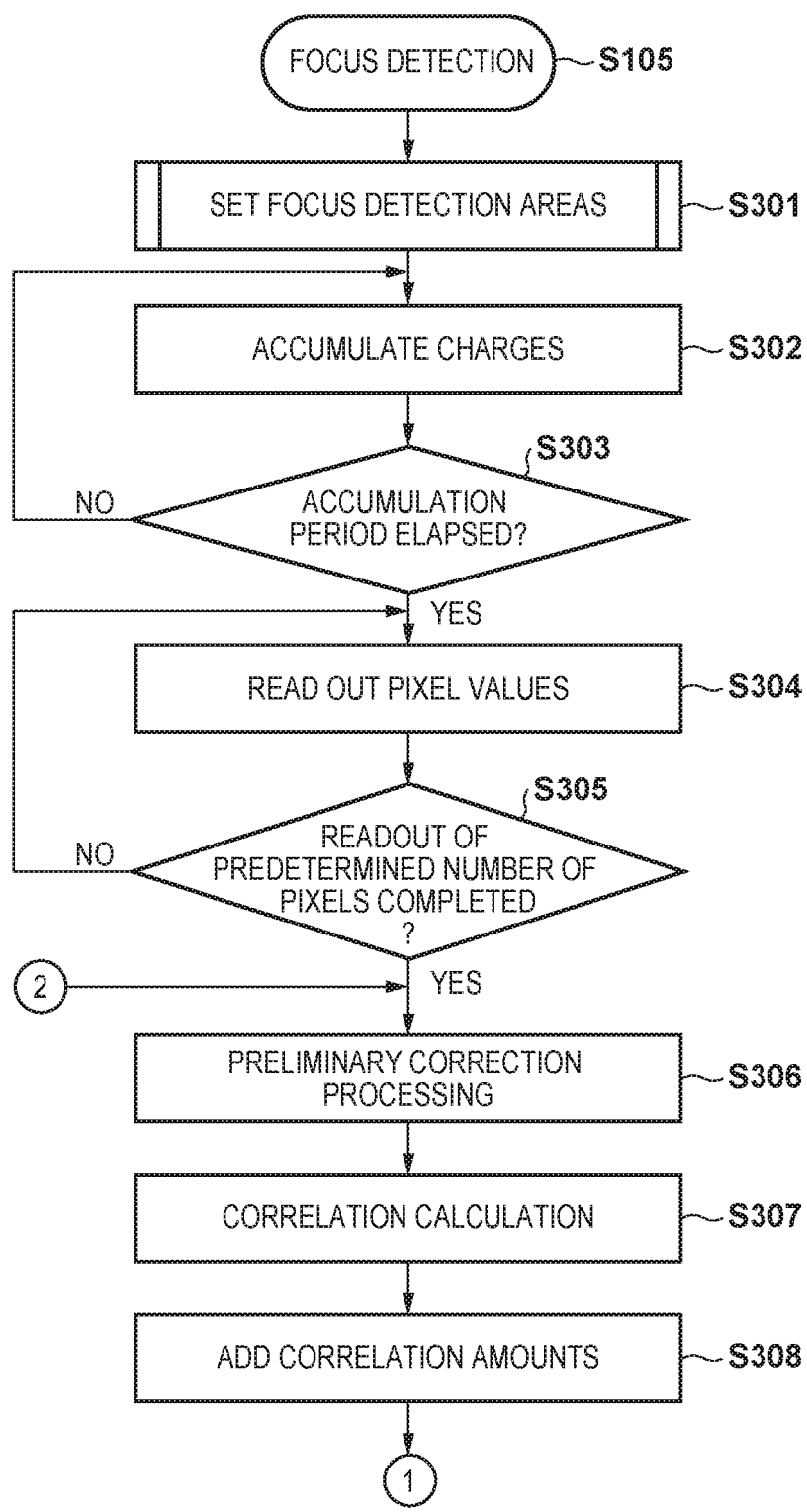

FOCUS DETECTION APPARATUS, FOCUS DETECTION METHOD, AND IMAGE CAPTURING APPARATUS

BACKGROUND OF THE INVENTION

Field of the Invention

The present invention relates to a focus detection apparatus, a focus detection method, and an image capturing apparatus, and more specifically to a focus detection apparatus, a focus detection method, and an image capturing apparatus that perform autofocus control based on an on-imaging plane phase difference detection method.

Description of the Related Art

Image capturing apparatuses, such as cameras, utilize autofocus (AF) methods, one example of which is a phase difference detection method (hereinafter, "phase difference AF"). With phase difference AF, a light beam that has passed through an exit pupil of an imaging lens is divided into two, and a pair of focus detection sensors receive the two divided light beams, respectively. Then, a shift amount of signals output from the pair of focus detection sensors, that is, a relative positional shift amount in the direction of light beam division (hereinafter, "image shift amount"), is detected. A focus lens is controlled by obtaining a shift amount in a focusing direction of the imaging lens (hereinafter, "defocus amount") from the image shift amount thus obtained.

On-imaging plane phase difference AF has been proposed that provides a phase difference detection function to an image sensor, thereby rendering dedicated focus detection sensors unnecessary, and achieving phase difference AF at high speed. On-imaging plane phase difference AF provides a pupil division function by dividing a photoelectric conversion unit of a pixel of the image sensor into two parts, performs focus detection by individually processing the outputs from the two divided parts, and uses a sum of the outputs from the two divided parts as an image signal.

Japanese Patent Laid-Open No. 2011-247938 discloses a configuration related to a method of adding focus detection signals in on-imaging plane phase difference AF; this configuration detects whether the position of a subject has changed, and changes the number of frames of focus detection signals to be added based on the detection result. Furthermore, Japanese Patent Laid-Open No. 2014-32214 discloses a method of setting the number of luminances to be added, as well as the number of correlation curves to be added after correlation calculation, to suppress noise of focus detection signals.

Although the configurations of Japanese Patent Laid-Open No. 2011-247938 and No. 2014-32214 aim to increase the accuracy of focus detection by suppressing noise of focus detection signals through addition of the focus detection signals in a time direction and a space direction, they do not take a calculation period into consideration. Therefore, they face the problem of a long calculation period in performing high-accuracy focus detection. Especially, when subject tracking or prediction is performed, a reduction in a calculation period is demanded due to the necessity of sampling in a time direction.

SUMMARY OF THE INVENTION

The present invention has been made in consideration of the above situation, and performs focus detection based on an on-imaging plane phase difference method with an improved subject tracking performance when a subject is a moving body.

According to the present invention, provided is a focus detection apparatus that performs focus detection based on a phase difference method using signals output from an image sensor including a plurality of focus detection pixels, each focus detection pixel having a first photoelectric portion and a second photoelectric portion that share one microlens and receive light beams passing through different pupil regions of an imaging optical system, the focus detection apparatus comprising: a setting unit that sets one or more focus detection areas in which the focus detection is performed, such that a subject in an image formed on the image sensor is included therein; a detection unit that detects whether at least one of a position and a size of the subject has changed; a division unit that divides each of the one or more focus detection areas into a plurality of divisional areas in a preset first direction in accordance with a result of the detection by the detection unit; and a focus detection unit that for each divisional area, adds signals output from the first photoelectric portions included in the divisional area in the first direction, adds signals output from the second photoelectric portions included in the divisional area in the first direction, and obtains correlation amounts while shifting a pair of signals obtained through the addition relative to each other, and adds the obtained correlation amounts of the divisional areas for each focus detection area, and performs the focus detection based on a result of adding the obtained correlation amounts, wherein the division unit makes a divisor used in obtaining the divisional areas smaller when at least one of the position and the size of the subject has changed than when there is no change in the position and the size of the subject.

According to the present invention, provided is a focus detection apparatus that performs focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection apparatus comprising: a setting unit that sets one or more focus detection areas in which the focus detection is performed, such that a subject in an image formed on the image sensor is included therein; a detection unit that, if a position of the subject has changed, detects a movement amount of the position of the subject; and a focus detection unit that performs the focus detection in each focus detection area based on signals output from the focus detection pixels included in the focus detection area, wherein the setting unit makes the number of the focus detection areas to be set smaller when the movement amount of the position of the subject is smaller than a preset first threshold than when the movement amount is equal to or larger than the first threshold.

Further, according to the present invention, provided is a focus detection apparatus that performs focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection apparatus comprising: a setting unit that sets one or more focus detection areas in which the focus detection is performed, such that a subject in an image formed on the image sensor is included therein; a detection unit that detects whether a size of the subject has changed; and a focus detection unit that performs the focus detection in each focus detection area by obtaining correlation amounts while shifting signals output from the plurality of photoelectric portions relative to each other, wherein the focus detection unit sets a range of the shifting to be smaller when a change amount of the size of the subject detected by the detection unit is smaller than a preset threshold than when the change amount is equal to or larger than the threshold.

Furthermore, according to the present invention, provided is an image capturing apparatus, comprising: an image sensor including a plurality of focus detection pixels, each focus detection pixel having a first photoelectric portion and a second photoelectric portion that share one microlens and receive light beams passing through different pupil regions of an imaging optical system; and a focus detection apparatus that performs focus detection based on a phase difference method using signals output from the image sensor, the focus detection apparatus comprising: a setting unit that sets one or more focus detection areas in which the focus detection is performed, such that a subject in an image formed on the image sensor is included therein; a detection unit that detects whether at least one of a position and a size of the subject has changed; a division unit that divides each of the one or more focus detection areas into a plurality of divisional areas in a preset first direction in accordance with a result of the detection by the detection unit; and a focus detection unit that for each divisional area, adds signals output from the first photoelectric portions included in the divisional area in the first direction, adds signals output from the second photoelectric portions included in the divisional area in the first direction, and obtains correlation amounts while shifting a pair of signals obtained through the addition relative to each other, and adds the obtained correlation amounts of the divisional areas for each focus detection area, and performs the focus detection based on a result of adding the obtained correlation amounts, wherein the division unit makes a divisor used in obtaining the divisional areas smaller when at least one of the position and the size of the subject has changed than when there is no change in the position and the size of the subject.

Further, according to the present invention, provided is an image capturing apparatus, comprising: an image sensor including a plurality of focus detection pixels, each focus detection pixel having a plurality of photoelectric portions that share one microlens and receive light beams passing through different pupil regions of an imaging optical system; and a focus detection apparatus that performs focus detection based on a phase difference method using signals output from the image sensor, the focus detection apparatus comprising: a setting unit that sets one or more focus detection areas in which the focus detection is performed, such that a subject in an image formed on the image sensor is included therein; a detection unit that, if a position of the subject has changed, detects a movement amount of the position of the subject; and a focus detection unit that performs the focus detection in each focus detection area based on signals output from the focus detection pixels included in the focus detection area, wherein the setting unit makes the number of the focus detection areas to be set smaller when the movement amount of the position of the subject is smaller than a preset first threshold than when the movement amount is equal to or larger than the first threshold.

Further, according to the present invention, provided is an image capturing apparatus, comprising: the image sensor including a plurality of focus detection pixels, each focus detection pixel having a plurality of photoelectric portions that share one microlens and receive light beams passing through different pupil regions of an imaging optical system; and a focus detection apparatus that performs focus detection based on a phase difference method using signals output from an image sensor, the focus detection apparatus comprising: a setting unit that sets one or more focus detection areas in which the focus detection is performed, such that a subject in an image formed on the image sensor is included therein; a detection unit that detects whether a size of the subject has changed; and a focus detection unit that performs the focus detection in each focus detection area by obtaining correlation amounts while shifting signals output from the plurality of photoelectric portions relative to each other, wherein the focus detection unit sets a range of the shifting to be smaller when a change amount of the size of the subject detected by the detection unit is smaller than a preset threshold than when the change amount is equal to or larger than the threshold.

Further, according to the present invention, provided is a focus detection method for performing focus detection based on a phase difference method using signals output from an image sensor including a plurality of focus detection pixels, each focus detection pixel having a first photoelectric portion and a second photoelectric portion that share one microlens and receive light beams passing through different pupil regions of an imaging optical system, the focus detection method comprising: setting one or more focus detection areas in which the focus detection is performed, such that a subject in an image formed on the image sensor is included therein; detecting whether at least one of a position and a size of the subject has changed; dividing each of the one or more focus detection areas into a plurality of divisional areas in a preset first direction in accordance with a result of the detection; for each divisional area, adding signals output from the first photoelectric portions included in the divisional area in the first direction, and adding signals output from the second photoelectric portions included in the divisional area in the first direction; for each divisional area, obtaining correlation amounts while shifting a pair of signals obtained through the addition relative to each other; for each focus detection area, adding the obtained correlation amounts of the divisional areas; and performing the focus detection based on a result of adding the obtained correlation amounts, wherein in the dividing, a divisor used in obtaining the divisional areas is made smaller when at least one of the position and the size of the subject has changed than when there is no change in the position and the size of the subject.

Further, according to the present invention, provided is a focus detection method for performing focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection method comprising: setting one or more focus detection areas in which the focus detection is performed, such that a subject in an image formed on the image sensor is included therein; if a position of the subject has changed, detecting a movement amount of the position of the subject; and performing the focus detection in each focus detection area based on signals output from the focus detection pixels included in the focus detection area, wherein in the setting, the number of the focus detection areas to be set is made smaller when the movement amount of the position of the subject is smaller than a preset first threshold than when the movement amount is equal to or larger than the first threshold.

Further, according to the present invention, provided is a focus detection method for performing focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection method comprising: setting one or more focus detection areas in which the focus detection is performed, such that a subject in an image formed on the image sensor is included therein; detecting whether a size of the subject has changed; and performing the focus detection in each focus detection area by obtaining correlation amounts while shifting signals output from the plurality of photoelectric portions relative to each other, wherein in the performing of the focus detection, a range of the shifting is set to be smaller when a change amount of the size of the subject detected is smaller than a preset threshold than when the change amount is equal to or larger than the threshold.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 10A and 10B are flowcharts of focus detection processing according to the first embodiment;

DESCRIPTION OF THE EMBODIMENTS

Exemplary embodiments of the present invention will be described in detail in accordance with the accompanying drawings.

First Embodiment

First, a configuration of an image capturing apparatus according to a first embodiment will be described with reference to FIG. 1. Examples of an image capturing apparatus 100 according to the present invention include, but are not limited to, a video camera and a digital still camera that can capture an image of a subject and record data of videos and still images to various types of media, such as a tape, a solid-state memory, an optical disc, and a magnetic disk.

Figure 1:
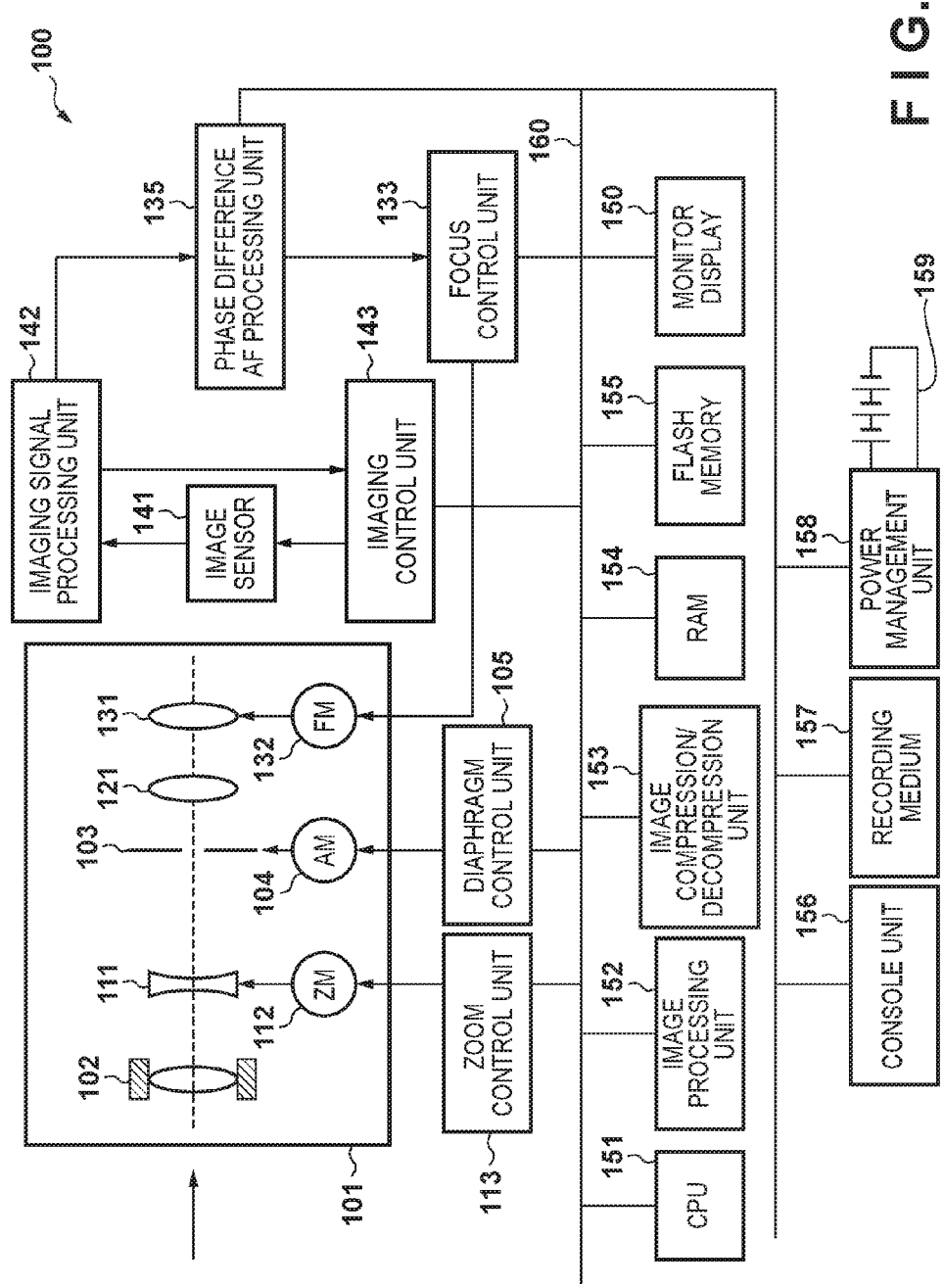
FIG. 1 is a block diagram showing a configuration of an image capturing apparatus equipped with a focus detection apparatus according to a first embodiment of the present invention.

As shown in FIG. 1, the internal components of the image capturing apparatus 100 are connected via a bus 160 and controlled by a CPU 151. The image capturing apparatus 100 includes an image sensor 141 having a plurality of pixels that are each provided with a plurality of photoelectric converters sharing one microlens, and is equipped with a focus detection apparatus that performs focus detection based on a phase difference method (phase difference AF) using image signals output from the image sensor 141.

Note that the focus detection apparatus according to the first embodiment is applied to an image capturing system composed of the main body of the image capturing apparatus 100, which can capture an optical image obtained via an imaging lens 101 (imaging optical system), and the imaging lens 101 attachable to and detachable from the main body of the image capturing apparatus 100. However, the present invention is not limited in this way, and the focus detection apparatus can also be applied to an image capturing apparatus including an imaging lens integrated with the main body of the image capturing apparatus.

The imaging lens 101 is configured as a lens unit including a first solid-state lens group 102, a zoom lens 111, a diaphragm 103, a second solid-state lens group 121, and a focus lens 131. A diaphragm control unit 105 adjusts the aperture diameter of the diaphragm 103 by driving the diaphragm 103 via a diaphragm motor 104 in accordance with an instruction from the CPU 151, thereby adjusting the amount of light at the time of image capture. A zoom control unit 113 changes a focal length by driving the zoom lens 111 via a zoom motor 112.

A focus control unit 133 controls a focus state by driving the focus lens 131 via a focus motor 132. The focus lens 131 is a lens for focus adjustment, and normally composed of a plurality of lenses although it is depicted as a single lens in FIG. 1 for simplicity.

A subject image that is formed on the image sensor 141 by the imaging lens 101 composed of the foregoing optical members is converted into electric signals by the image sensor 141. The image sensor 141 includes a pixel unit that converts a subject image (optical image) into electric signals through photoelectric conversion. The pixel unit is configured such that two photoelectric converters (light receiving regions) are arranged in each of light receiving elements composing m pixels in a transverse (horizontal) direction and n pixels in a longitudinal (vertical) direction, as will be described later. Electric signals obtained through photoelectric conversion of a subject image formed on the image sensor 141 are fixed by an imaging signal processing unit 142 as image signals (image data).

A phase difference AF processing unit 135 obtains, from the imaging signal processing unit 142, image signals that have been output from two photoelectric converters (first and second photoelectric converters) individually (independently of each other). Then, an image shift amount of images obtained by dividing light from a subject in the direction of division is obtained. The phase difference AF processing unit 135 also calculates a shift amount of the imaging lens 101 in a focusing direction (defocus amount) based on the obtained image shift amount. The defocus amount is calculated by multiplying the image shift amount by a conversion coefficient. Note that the operations involving detection of an image shift amount and calculation of a defocus amount are executed based on an instruction from the CPU 151. The CPU 151 or the focus control unit 133 may be configured to execute at least a part of these operations.

The phase difference AF processing unit 135 outputs the calculated defocus amount to the focus control unit 133. The focus control unit 133 determines a driving amount, by which the focus motor 132 is to be driven, based on the shift amount. Then, the focus control unit 133 and the focus motor 132 control the movement of the focus lens 131, thereby achieving AF control.

Image data output from the imaging signal processing unit 142 is also transmitted to an imaging control unit 143 and temporarily stored in a RAM 154. Image data stored in the RAM 154 is compressed by an image compression/decompression unit 153, and then recorded to a recording medium 157.

In parallel with these operations, image data stored in the RAM 154 is transmitted to an image processing unit 152. The image processing unit 152 processes image signals obtained using added signals from first and second photoelectric converters. The image processing unit 152 applies, for example, processing for reducing/enlarging the image data to an optimal size for image display. After being processed to have the optimal size, the image data is transmitted to a monitor display 150 and displayed as an image. This enables an operator to observe a captured image in real time. Note that immediately after image capture, the monitor display 150 displays the captured image for a predetermined period to enable the operator to check the captured image.

Further, the image processing unit 152 can perform subject recognition, such as facial detection, with reference to image data stored in the RAM 154. A known detection technique can be applied to a technique of such subject recognition, one example of the known detection technique being a method of using template matching to search an image for a portion with a characteristic shape, such as a face and a body, and assuming the portion as a subject if the portion has a high similarity degree. These operations of subject recognition are executed based on an instruction from the CPU 151. The CPU 151 may be configured to execute at least a part of these operations.

A console unit 156, which is composed of switches, dials, buttons, and the like, is used by the operator to issue an instruction to the image capturing apparatus 100, and is capable of setting an image capturing mode and a playback mode, selecting and switching among various types of functions in executing image capture and playback, etc. A console instruction signal input from the console unit 156 is transmitted to the CPU 151 via the bus 160.

In the image capturing mode, the CPU 151 determines an accumulation period for the image sensor 141 based on an instruction from the console unit 156 or the signal level of image data temporarily stored in the RAM 154. Similarly, the CPU 151 determines a gain value to be output from the image sensor 141 to the imaging signal processing unit 142 and a diaphragm value to be set for the diaphragm 103 based on an instruction from the console unit 156 or the signal level of image data temporarily stored in the RAM 154.

The imaging control unit 143 controls the image sensor 141 and the imaging signal processing unit 142 based on an instruction received from the CPU 151 indicating the accumulation period and the setting value of the gain, whereas the diaphragm control unit 105 controls the diaphragm 103 based on a received instruction indicating the diaphragm value.

A battery 159 is appropriately managed by a power management unit 158 to supply power to the entirety of the image capturing apparatus 100 in a stable manner. A flash memory 155 stores control programs necessary for the operations of the image capturing apparatus 100.

In response to an operation performed by the operator, the image capturing apparatus 100 is activated and shifts from a power OFF state to a power ON state, and then the control programs stored in the flash memory 155 are read into a part of the RAM 154. The CPU 151 controls the operations of the image capturing apparatus 100 in accordance with the control programs that have been read into the RAM 154.

Figure 2:
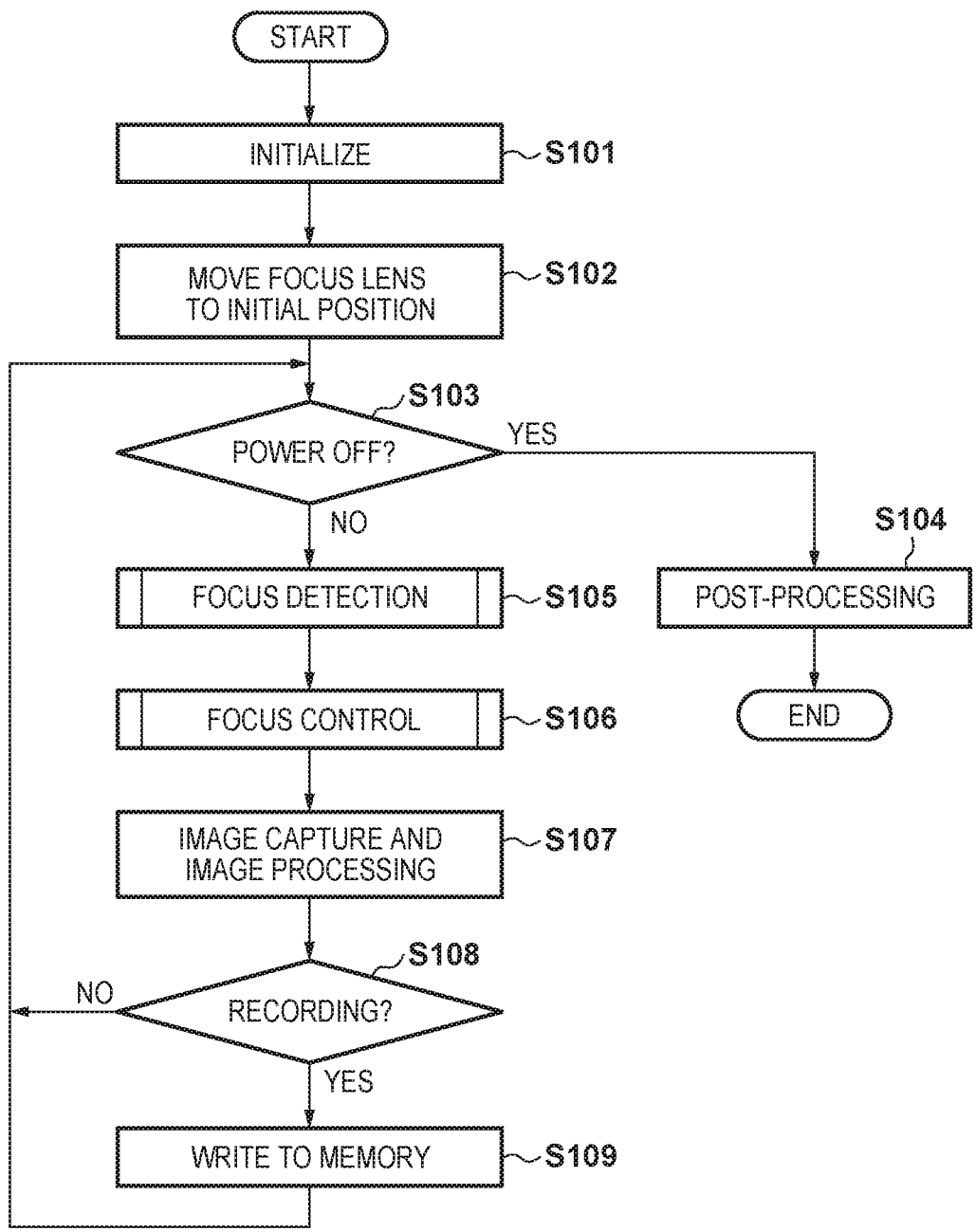
FIG. 2 is a flowchart of an image capturing operation of the image capturing apparatus according to the first embodiment.

A description is now given of an image capturing operation of the image capturing apparatus 100, including focus adjustment, with reference to FIG. 2. FIG. 2 is a flowchart of the image capturing operation of the image capturing apparatus 100. Steps of FIG. 2 are executed based on an instruction compliant with a control program for the CPU 151.

When the power is turned ON, the image capturing apparatus 100 enters the image capturing mode, and the CPU 151 starts the image capturing operation. First, for example, flags and control variables of the image capturing apparatus 100 are initialized in step S101, and the optical members (imaging optical members), such as the focus lens 131, are moved to their respective initial positions in step S102.

Next, in step S103, the CPU 151 detects whether the operator has performed a power OFF operation. If the power OFF operation is detected in step S103, processing proceeds to step S104. In step S104, in order to turn OFF the power of the image capturing apparatus 100, the CPU 151 moves the imaging optical members to their respective initial positions, executes post-processing for, for example, clearing various types of flags and control variables, and ends the image capturing operation of the image capturing apparatus 100.

On the other hand, if the power OFF operation is not detected in step S103, processing proceeds to step S105 in which the CPU 151 executes focus detection processing. Next, in step S106, the focus control unit 133 executes focus control processing for moving the focus lens 131 to a desired position by driving the focus lens 131 in accordance with a driving direction, speed, and position that have been determined in the focus detection processing executed in step S105. The details of the focus detection processing executed in step S105 and the focus control processing executed in step S106 will be described later.

Next, in step S107, the image sensor 141 generates imaging signals by photoelectrically converting a subject image through main exposure. Then, the imaging signal processing unit 142 applies predetermined image processing to the imaging signals generated through the photoelectrical conversion, outputs image signals, and performs subject recognition.

Next, in step S108, the CPU 151 determines whether recording is currently taking place by detecting whether the operator has pressed a recording button included in the console unit 156. If recording is not currently taking place, processing returns to step S103. On the other hand, if recording is currently taking place, processing proceeds to step S109.

In step S109, the image compression/decompression unit 153 applies compression processing to the image signals (image data) output from the imaging signal processing unit 142, and the image signals (image data) are recorded on the recording medium 157. Thereafter, processing returns to step S103, and the foregoing steps are repeated.

A description is now given of a phase difference detection method according to the first embodiment. First, a configuration of the image sensor 141 will be described with reference to FIGS. 3A to 3C.

Figure 3A:
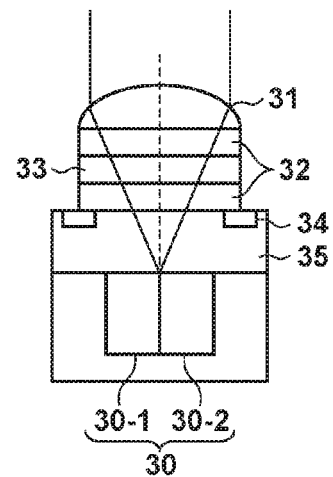
FIGS. 3A to 3C illustrate a configuration of an image sensor according to the first embodiment.

FIG. 3A is a diagram (cross-sectional view) showing a configuration of pixels in the image sensor 141 having a pupil division function. In each pixel, a photoelectric converter 30 is divided into two parts, that is, a photoelectric converter 30-1 (first photoelectric converter) and a photoelectric converter 30-2 (second photoelectric converter), and has the pupil division function. Although the present embodiment is described assuming that every pixel of the image sensor 141 is configured as a focus detection pixel that has the divided two photoelectric converters 30-1 and 30-2, the present invention is not limited in this way. It is sufficient that at least a part of the pixels is configured as focus detection pixels to enable phase difference AF.

An on-chip microlens 31 (hereinafter, "microlens") has a function of efficiently collecting light onto the photoelectric converter 30, and is disposed such that an optical axis coincides with a boundary between the photoelectric converters 30-1 and 30-2. Each pixel has planarizing films 32, a color filter 33, wires 34, and an interlayer insulating film 35.

Figure 3B:
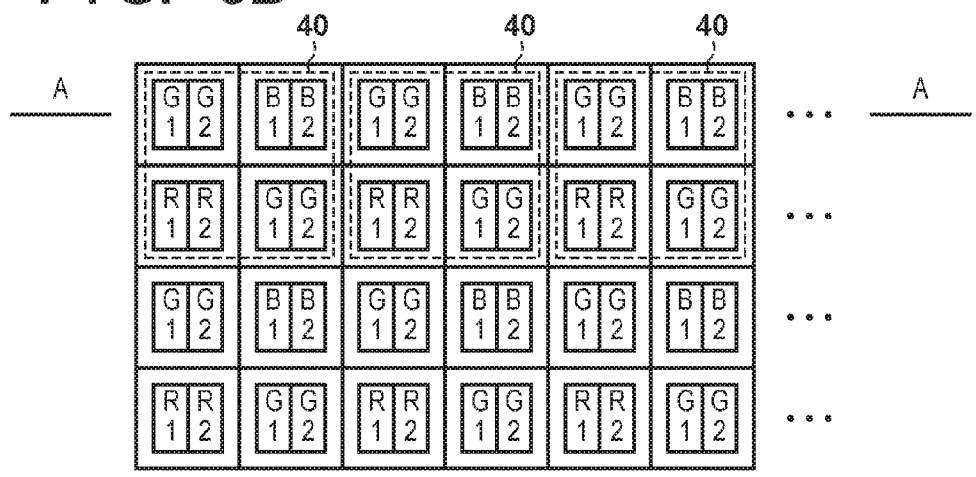

FIG. 3B is a plan view showing a part of a pixel array in the image sensor 141. The image sensor 141 is formed by arraying a plurality of pixels that are each configured as shown in FIG. 3A. One of alternatingly-arranged red (R), green (G), and blue (B) color filters 33 is disposed in each pixel, and an array of four pixels forms one pixel block 40; thus, a so-called Bayer array is constructed. In FIG. 3B, "1" and "2" indicated below the letters R, G, and B correspond to the photoelectric converters 30-1 and 30-2, respectively.

Figure 3C:
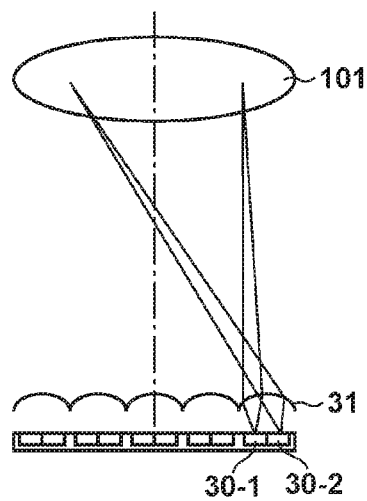

FIG. 3C is a partial cross-sectional view taken along the like A-A of FIG. 3B, showing the optical principle of the image sensor 141. The image sensor 141 is disposed on an expected image forming plane of the imaging lens 101. The photoelectric converters 30-1 and 30-2 are configured to receive a pair of light beams that have passed through different regions of an exit pupil of the imaging lens 101 due to the action of the microlens 31.

The photoelectric converter 30-1 mainly receives a light beam that passes through a right region of the exit pupil of the imaging lens 101 in FIG. 3C. On the other hand, the photoelectric converter 30-2 mainly receives a light beam that passes through a left region of the exit pupil of the imaging lens 101 in FIG. 3C.

Figure 4:
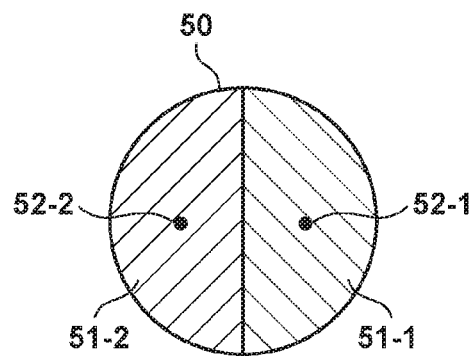
FIG. 4 illustrates pupil division of an imaging lens according to the first embodiment.

The exit pupil of the imaging lens 101 will now be described with reference to FIG. 4. FIG. 4 shows the exit pupil 50 of the imaging lens 101 as viewed from the image sensor 141.

In FIG. 4, a right region 51-1 of the exit pupil 50 is a pupil region corresponding to a sensitivity region of the photoelectric converter 30-1 (hereinafter, "A image pupil"), whereas a left region 51-2 is a pupil region corresponding to a sensitivity region of the photoelectric converter 30-2 (hereinafter, "B image pupil"). Points 52-1 and 52-2 indicate the positions of centers of mass of the A image pupil 51-1 and the B image pupil 51-2, respectively.

In executing the image capturing operation in the first embodiment, an image signal can be generated by adding the outputs from two photoelectric converters 30-1 and 30-2 that constitute the same pixel and have the same color filter.

On the other hand, in executing the focus detection processing according to the first embodiment, one focus detection signal is obtained by cumulating the outputs from four photoelectric converters 30-1 within one pixel block 40. Then, an A image signal is generated by successively obtaining focus detection signals of pixel blocks 40 in the transverse (horizontal) direction.

Similarly, one focus detection signal is obtained by cumulating the outputs from four photoelectric converters 30-2 within one pixel block 40. Then, a B image signal is generated by successively obtaining focus detection signals of pixel blocks 40 in the transverse direction. A pair of phase difference detection signals is generated from the A image signal and the B image signal thus generated.

Figure 5A:
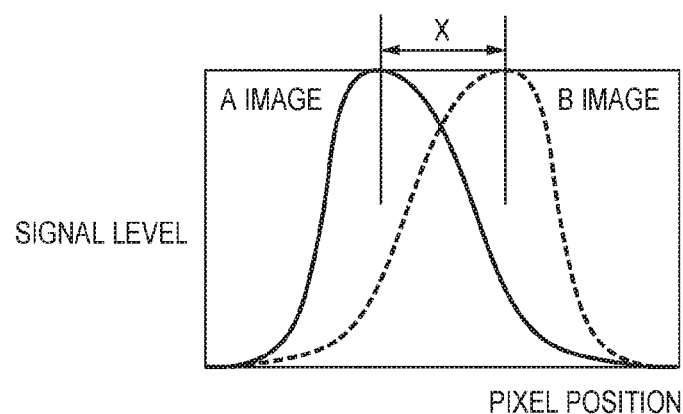
FIGS. 5A and 5B show examples of phase difference detection signals and an image shift amount.
Figure 5B:
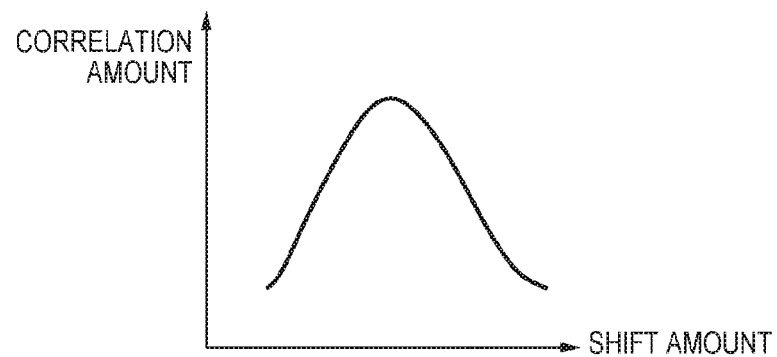

A description is now given of an A image signal and a B image signal (phase different detection signals) with reference to FIGS. 5A and 5B. FIG. 5A illustrates phase difference detection signals, and a vertical axis and a horizontal axis therein indicate a signal level of the phase difference detection signals and a pixel position, respectively. An image shift amount X of the generated A image signal and B image signal varies depending on an image forming state (in-focus state, front-focused state, or rear-focused state) of the imaging lens 101.

When the imaging lens 101 is in the in-focus state, there is no image shift amount of the A image signal and the B image signal. On the other hand, in the front-focused state and the rear-focused state, an image shift amount is generated in different directions. An image shift amount has a certain relationship with a distance between the position at which a subject image is formed by the imaging lens 101 and a top surface of a microlens, that is, with a so-called defocus amount.

In view of this, correlation calculation is applied to the A image signal and the B image signal to calculate the image shift amount X. In this correlation calculation, correlation amounts are calculated while shifting one of the A image signal and the B image signal by one pixel at a time, and a shift amount that yields the largest correlation amount is calculated as the image shift amount X.

In performing this correlation calculation, pixel values of the A image signal and the B image signal obtained as shown in FIG. 5A may be thinned at a preset rate (hereinafter, "horizontal pixel thinning"). Such calculation with thinning lowers the calculation accuracy, but can accelerate the calculation.

FIG. 5B shows the correlation amounts obtained by shifting the A image signal and the B image signal (hereinafter, "correlation curve"). In FIG. 5B, a horizontal axis indicates shift amounts (in units of pixels), whereas a vertical axis indicates the correlation amounts of the A image signal and the B image signal in one-to-one correspondence with the shift amounts. The CPU 151 performs the correlation calculation. In calculating the correlation amounts, the A image signal and the B image signal are overlaid, corresponding signals are compared with each other, and a cumulative sum of smaller values is obtained. Alternatively, a cumulative sum of larger values may be obtained. Alternatively, differences between these values may be obtained. A value of the cumulative sum serves an index indicating a correlation; in the case where the cumulative sum of smaller values is obtained, the largest value of the cumulative sum yields the highest correlation. On the other hand, in the case where the cumulative sum of larger values or the differences are obtained, the smallest value of the cumulative sum yields the highest correlation.

Based on the value of the cumulative sum (correlation amounts) thus obtained, the phase difference AF processing unit 135 detects a shift amount that yields the largest correction amount, that is, the image shift amount X. Then, a defocus amount of the imaging lens 101 is obtained from the image shift amount X, and focus adjustment is performed by calculating a lens driving amount that places the imaging lens 101 in the in-focus state.

Figure 6:
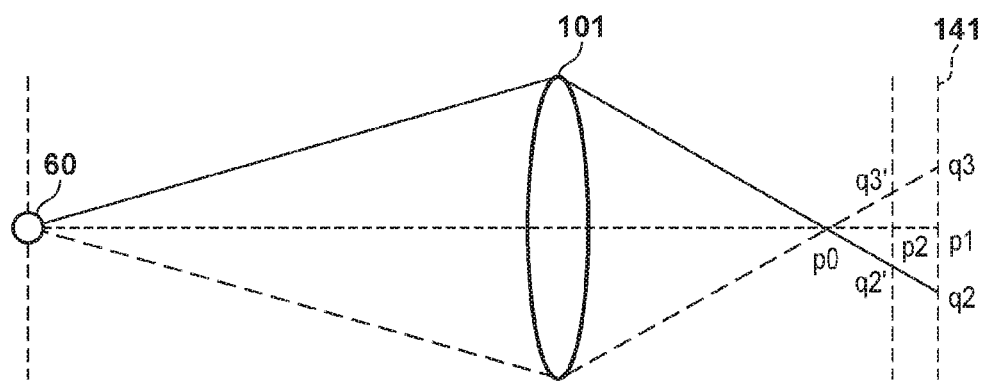
FIG. 6 illustrates the principle of conversion from an image shift amount into a defocus amount.

A description is now given of the concept of conversion from an image shift amount X calculated through correlation calculation into a defocus amount with reference to FIG. 6. FIG. 6 shows the optical system including the imaging lens 101 and the image sensor 141. A position p1 of a focus detection plane lies on an optical axis OA on a position p0 of an expected image forming plane for a subject 60. The relationship between the image shift amount and the defocus amount is determined in accordance with the optical system. The defocus amount can be calculated by multiplying the image shift amount X by a predetermined coefficient K (conversion coefficient).

The coefficient K is calculated based on the positions of centers of mass 52-1 and 52-2 of the A image pupil 51-1 and the B image pupil 51-2. If the position p1 of the focus detection plane shifts to a position p2, the image shift amount X changes in accordance with the similarity between a triangle formed by positions p0, q2 and q3 and a triangle formed by positions p0, q2' and q3'. The defocus amount at the position p2 on the focus detection plane can be calculated from a movement amount between the positions p1 and p2 and from a change amount of the image shift amount X. Based on the defocus amount, the CPU 151 calculates the position of the focus lens 131 for achieving the in-focus state with respect to the subject.

Figure 7A:
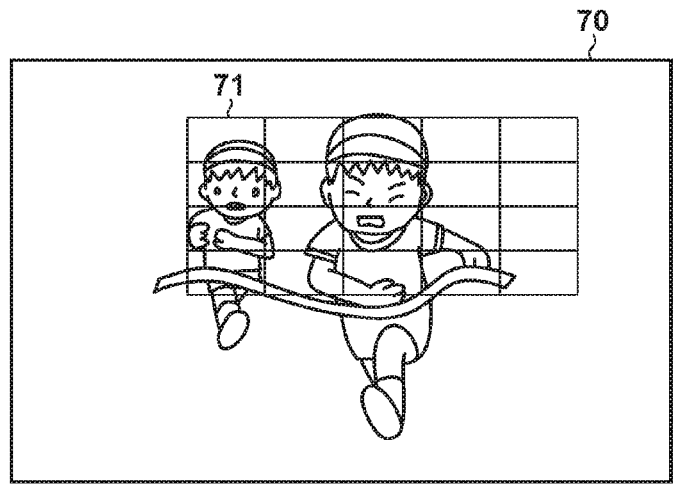
FIGS. 7A and 7B show examples of focus detection areas according to the first embodiment.
Figure 7B:
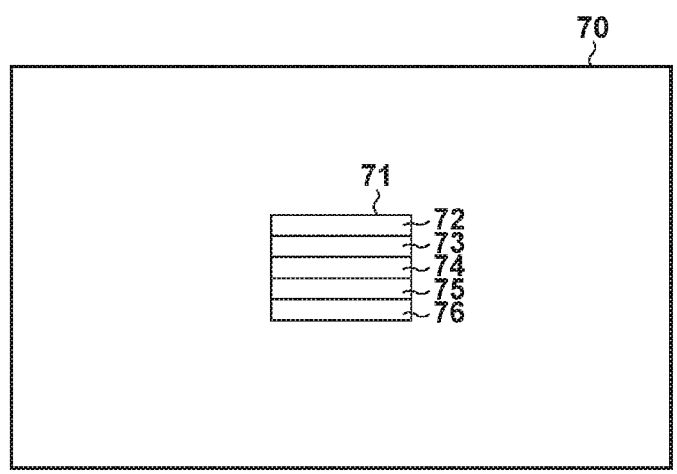

A description is now given of a method of setting focus detection areas used by a focus detection method according to the first embodiment with reference to FIGS. 7A and 7B. FIGS. 7A and 7B show examples of focus detection areas.

In the present first embodiment, as shown in FIG. 7A, focus detection areas 71 of appropriate sizes are set at appropriate positions within an imaging angle of view 70. An appropriate number of focus detection areas 71 are set in accordance with a subject, and focus detection is performed in each of the focus detection areas 71. For example, in order to capture a face as a subject and keep focusing on the face, a focus detection area 71 of an appropriate size is set at an appropriate position near the detected face based on the result of detection through facial recognition. Furthermore, a plurality of focus detection areas 71 may be set around the face to enable focus detection compatible with on-screen movements of the face. Note that the subject targeted for focus detection is not limited to a face, and may be a subject or range designated by a user operation.

As shown in FIG. 7B, each of the focus detection areas 71 according to the first embodiment is divided into divisional areas 72 to 76 in a longitudinal direction (first direction) in the figure. In each of the divisional areas 72 to 76, the phase difference AF processing unit 135 generates phase difference detection signals by adding luminance signals for the number L1 of luminance lines in the longitudinal direction, and performs focus detection.

Correlation curves corresponding to a divisor L2 are obtained by performing correlation calculation in all of the divisional areas 72 to 76. Adding these correlation curves corresponding to the divisor L2 yields a final correlation curve of the corresponding focus detection area 71.

Then, based on this correlation curve of the focus detection area 71, an image shift amount X that yields the largest correlation amount is calculated. In the present embodiment, the largest possible divisor L2 is the number of pixel blocks 40 included in the focus detection area 71 in the longitudinal direction in the figure, and the ratio between the number L1 of luminance lines to be added and the divisor L2 within the focus detection area 71 can be controlled with use of the divisor.

By increasing the number L1 of luminance lines to be added and reducing the divisor L2 within the focus detection area 71, the number of times correlation calculation is performed can be reduced and calculation can be accelerated, but the calculation accuracy is lowered in the case of a subject having a fine pattern as a result of the addition of luminance lines.

In the first embodiment, when a main subject, such as a face, has been detected, focus detection is performed with respect to the position of the main subject within the imaging angle of view 70 and the results of focus detection are successively used in order to keep focusing on the main subject; thus, focus adjustment is performed in pursuit of a moving body.

Figure 8:
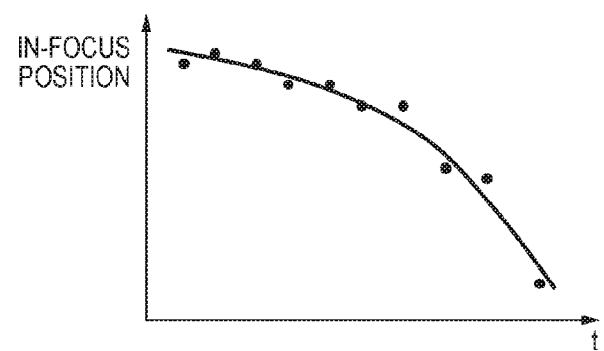
FIG. 8 is a diagram for explaining a method of predicting the position of a moving body according to the first embodiment.

FIG. 8 is a diagram for explaining a method of predicting the position of a moving body by successively using the results of focus detection (in-focus positions). In this figure, a horizontal axis indicates time, whereas a vertical axis indicates in-focus positions in one-to-one correspondence with time points. The position that a main subject will take next can be predicted based on elapse of time and the course of in-focus positions. Furthermore, adjusting the focus lens 131 based on the result of this prediction enables control to maintain the in-focus state, even if the main subject is moving. However, when there are a plurality of focus detection areas and calculation takes time in each focus detection area, a single operation of focus detection takes long. This results in coarse sampling of in-focus positions in a time direction, thereby possibly lowering the accuracy of prediction of a moving body.

In view of this, in the first embodiment, upon entering a mode for predicting the movement of a moving body, settings for focus detection areas are changed to reduce a period for a single operation of focus detection.

Figure 9:
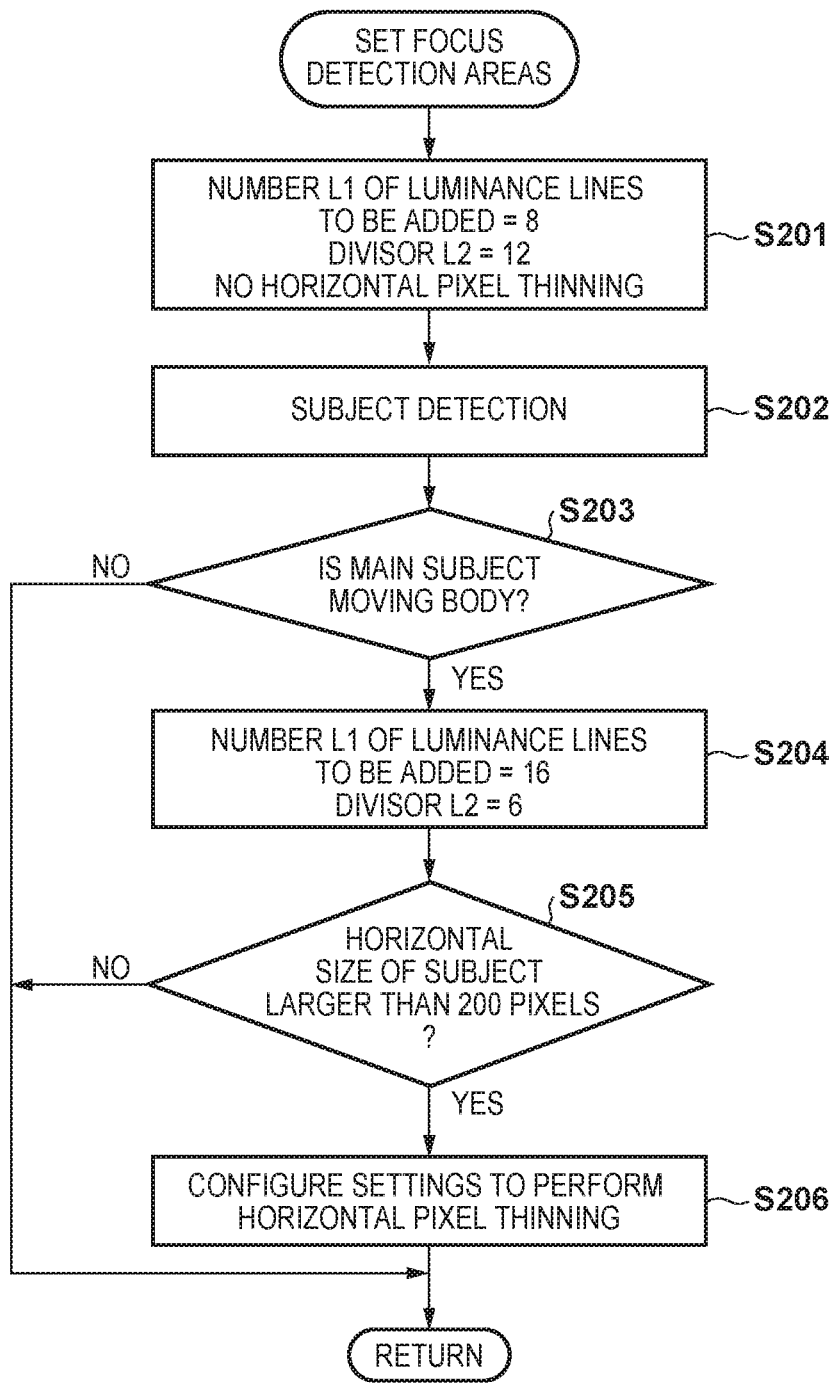
FIG. 9 is a flowchart of a method of setting focus detection areas according to the first embodiment.

The following describes the method of setting focus detection areas according to the first embodiment with reference to FIG. 9. Steps of FIG. 9 are executed by the CPU 151.

First, in step S201, initial settings for the focus detection areas 71 are configured. Herein, as one example, the following initial values are set: 8 as the number L1 of luminance lines to be added (corresponding to 4 pixel blocks), 12 as the divisor L2, and no horizontal pixel thinning. Next, in step S202, subject detection is performed. This subject detection is performed through subject recognition, such as facial detection, performed by the image processing unit 152.

In step S203, whether the detected subject is a moving body is determined. In order to make this determination, whether a main subject, which is a subject to be captured, is moving is determined by checking the result of subject recognition several times in the time direction. Specifically, the detected subject is determined to be a moving body if at least one of the position and size of the main subject is changing in the time direction. In this determination, several results of focus detection from the past may be referenced. If there is a change in the time direction, the subject is determined to be a moving body; if there is no change in the time direction, the subject is not determined to be a moving body. If the subject is not determined to be a moving body in step S203, processing ends.

On the other hand, if the subject is determined to be a moving body in step S203, processing proceeds to step S204 in which the number L1 of luminance lines to be added is set to 16 (corresponding to 8 pixel blocks), and the divisor L2 is set to 6. By thus increasing the number L1 of luminance lines to be added and reducing the divisor L2 within each focus detection area 71, the number of times correlation calculation is performed is reduced, and a calculation period is reduced. This can enhance sampling for focus detection in the time direction to track the moving body.

Next, in step S205, whether a horizontal size of the subject detected in step S202 is larger than 200 pixels (first threshold) is determined. If the horizontal size is equal to or smaller than 200 pixels, processing ends; if the horizontal size is larger than 200 pixels, processing proceeds to step S206.

In step S206, settings are configured to perform horizontal pixel thinning. At this time, correlation calculation is performed using, for example, pixel data of every other pixel from among the obtained luminance curves. As a result, the calculation period is reduced. Although thinning is performed in a horizontal direction (second direction) to reduce the amount of pixel data in the foregoing description, the amount of pixel data may be reduced through addition in the horizontal direction. Upon completion of configuration of settings for the focus detection areas in the foregoing manner, processing ends.

Figure 10B:
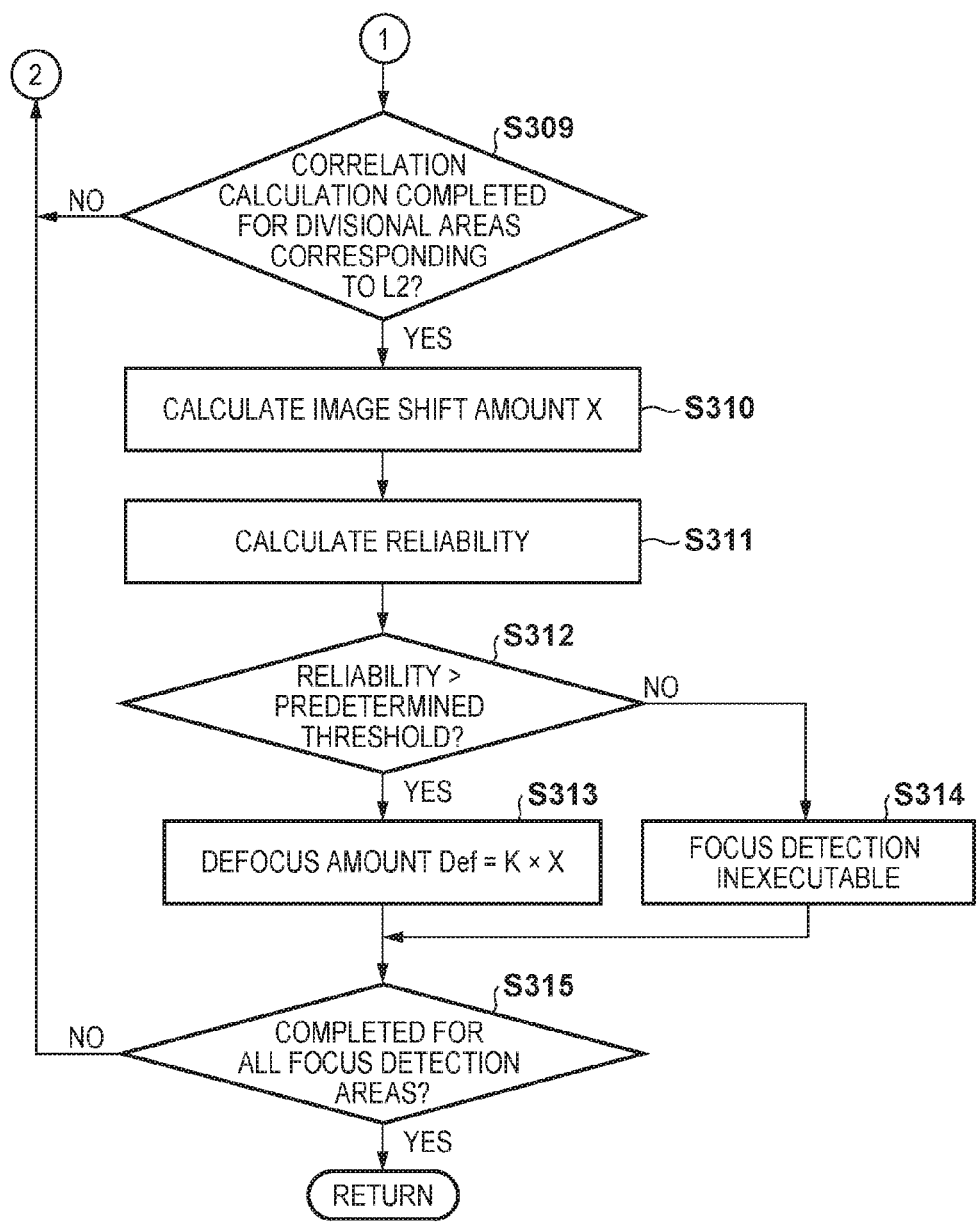

With reference to FIGS. 10A and 10B, the following describes the focus detection processing according to the first embodiment executed in step S105 of FIG. 2. Steps of FIGS. 10A and 10B are executed by the CPU 151, the phase difference AF processing unit 135, and the focus control unit 133.

When focus detection is started, the processing for setting the focus detection areas, which has been described with reference to FIG. 9, is executed first in step S301. Next, in order to obtain phase difference detection signals to be used in focus detection, the CPU 151 and the imaging control unit 143 control the image sensor 141 to accumulate charges (exposure) in accordance with a predetermined accumulation period (step S302). When the predetermined accumulation period has elapsed (YES of step S303), pixel values are read out from the photoelectric converters 30-1 and 30-2 of each focus detection area 71 in step S304.

Next, in step S305, the CPU 151 determines whether readout corresponding to a predetermined number of pixels has been completed in each focus detection area 71. If readout corresponding to the predetermined number of pixels has not been completed, processing returns to step S304, and steps S304 and S305 are repeated until readout corresponding to the predetermined number of pixels is completed.

If readout corresponding to the predetermined number of pixels is completed, in step S306, the focus control unit 133 performs division in accordance with the divisor L2, and applies preliminary correction processing to phase difference detection signals obtained through luminance addition in the first divisional area among the divisional areas of each focus detection area 71 shown in FIGS. 7A and 7B. This preliminary correction processing includes correction processing for image signals that have been read out, and filter processing for the image signals using an averaging filter, an edge enhancement filter, and the like.

Then, the CPU 151 (or the focus control unit 133 or the phase difference AF processing unit 135) calculates correlation curves similarly to the one shown in FIGS. 5A and 5B by performing correlation calculation in step S307, and adds the calculated correlation curves in step S308.

In step S309 in FIG. 10B, whether the correlation calculation and addition have been completed for the divisional areas corresponding to the number of the divisor L2 is determined; if the correlation calculation and addition have not been completed for the divisional areas corresponding to the number of the divisor L2, processing returns to step S306, and the correlation calculation is performed in the next divisional area. Thereafter, steps S306 to S309 are repeated until the correlation calculation and addition are completed for all of the divisional areas included in the focus detection area 71.

If it is determined in step S309 that the correlation calculation and addition completed for the divisional areas corresponding to the divisor L2, processing proceeds to step S310, and a shift amount that yields the highest correlation, that is, an image shift amount X, is calculated from the added correlation amounts. In this calculation of the image shift amount, interpolated values within one shift are also calculated by performing interpolation calculation using correlation values corresponding to the shift amount that yields the highest correlation and preceding and succeeding shift amounts. A sum of this shift amount and interpolated values is used as the image shift amount X. As described above, the CPU 151 and the phase difference AF processing unit 135 calculate the image shift amount by performing correlation calculation using signal values that have been independently obtained from the photoelectric converters 30-1 and 30-2.

Next, in step S311, the CPU 151 (or the focus control unit 133 or the phase difference AF processing unit 135) evaluates the reliability of the calculated image shift amount X. This reliability is calculated based on the contrasts of image signals, a degree of match between two image signals, and the like.

Next, in step S312, the CPU 151 (or the focus control unit 133 or the phase difference AF processing unit 135) determines whether the obtained image shift amount X is reliable based on the evaluated value of the calculated reliability. In this reliability determination, for example, the obtained image shift amount X is determined to be reliable if the evaluated value of the reliability calculated in step S311 is larger than a predetermined threshold; the obtained image shift amount X is determined to be unreliable if the evaluated value is equal to or smaller than the predetermined threshold. Note that in step S312, whether the subject is a difficult target of the correlation calculation is also determined.

If the obtained image shift amount X is determined to be reliable, the CPU 151 (or the focus control unit 133 or the phase difference AF processing unit 135) calculates a defocus amount Def by multiplying the calculated image shift amount X by the coefficient K in step S313. In calculating this defocus amount, posterior correction processing for enabling the imaging lens 101 to achieve a better focus on the subject may be executed.

On the other hand, if the detected image shift amount X is determined to be unreliable in step S312, phase difference AF is not performed (step S314), and the monitor display 150 performs display indicating that phase difference AF cannot be performed, thereby notifying the operator of the same.

In step S315, whether the calculation has been completed for all of the focus detection areas 71 set within the angle of view 70 is checked. If the calculation has not been completed, processing returns to step S306, and thereafter steps S306 to S315 are repeated until the calculation is completed for all of the focus detection areas 71.

If the calculation has been completed in step S315, the focus detection processing ends, thereby returning to a main routine that called this processing.

Figure 11:
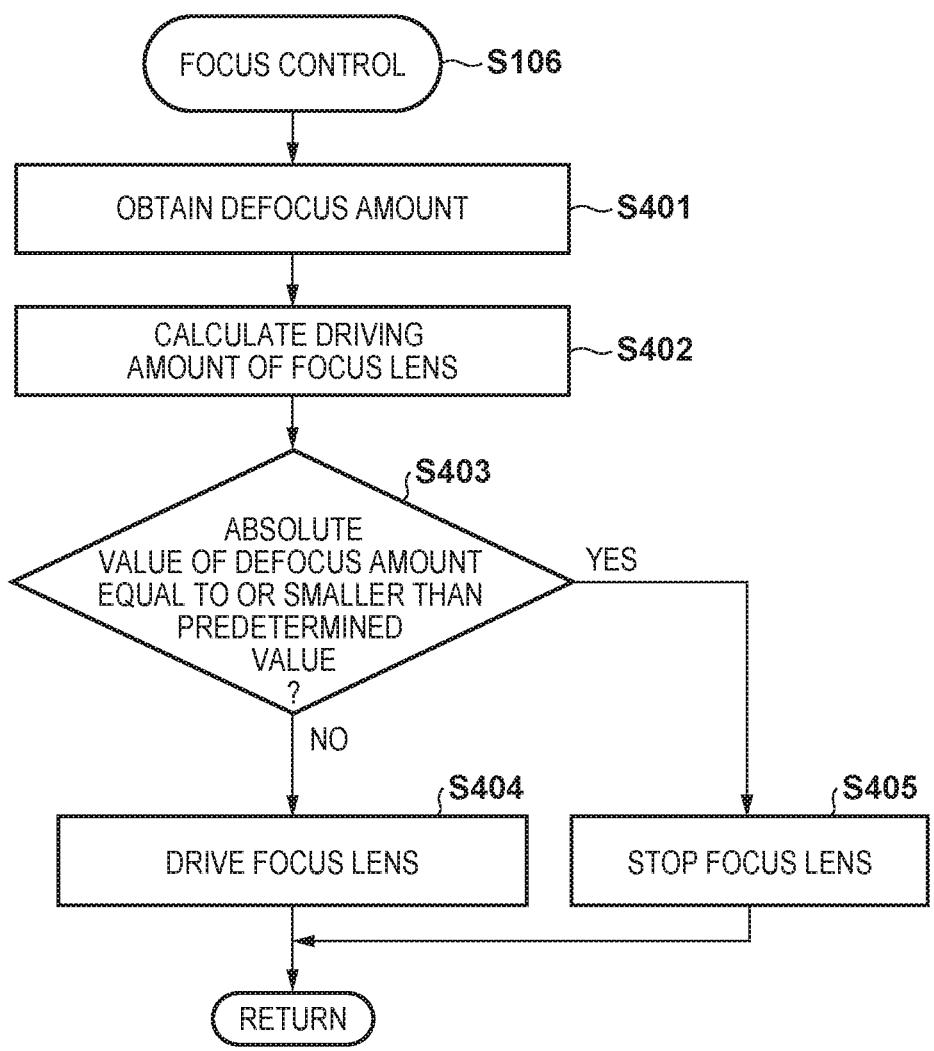
FIG. 11 is a flowchart of focus control processing according to the first embodiment.

With reference to FIG. 11, the following describes the focus control processing executed in the first embodiment. Steps of FIG. 11 are executed in step S106 of FIG. 2 by the CPU 151 and the focus control unit 133. When a focus control operation is started, the CPU 151 performs predetermined calculation in accordance with a control program. The focus control unit 133 controls the focus motor 132 based on an instruction from the CPU 151.

When focus control is started, in step S401, the focus control unit 133 obtains a defocus amount calculated in the focus detection processing described with reference to FIGS. 10A and 10B.

Then, in step S402, the focus control unit 133 calculates a driving amount of the focus lens 131 (lens driving amount) based on the defocus amount. In this calculation of the lens driving amount, a lens driving direction and speed are also calculated.

Next, in step S403, the CPU 151 (focus control unit 133) determines whether an absolute value of the defocus amount is equal to or smaller than a predetermined value. If the absolute value of the defocus amount is not determined to be equal to or smaller than the predetermined value in step S403, processing proceeds to step S404.

In step S404, the position of the focus lens 131 is treated as being different from an in-focus position (in-focus point), the focus lens 131 is driven in accordance with the lens driving amount calculated in step S402, and processing ends. Thereafter, focus detection and focus lens driving are repeated in accordance with the flow of FIG. 2.

On the other hand, if the absolute value of the defocus amount is determined to be equal to or smaller than the predetermined value in step S403, processing proceeds to step S405. At this time, the focus lens position is treated as being on an in-focus point, lens driving is stopped in step S405, and processing ends. Thereafter, focus detection is performed in step S105 in accordance with the flow of FIG. 2, and the focus lens 131 is driven if the defocus amount exceeds the predetermined value again.

As apparent from the flow of FIG. 2, the above-described operations of focus detection and focus control are executed multiple times to focus on a subject by repeating the flows of FIGS. 9, 10, and 11 until the power is turned OFF.

As described above, in the present first embodiment, calculation can be accelerated by controlling the ratio between the number of luminance lines to be added and the divisor in the focus detection areas based on the result of determining whether a subject is a moving body. When the subject is a moving body, sampling in the time direction is enhanced by accelerated calculation; this can increase the prediction accuracy and enables focus adjustment in pursuit of the moving body.

Note that the above-described numerical values in the first embodiment serve as examples. For example, instead of setting whether to perform horizontal pixel thinning after determining only whether the horizontal size of the subject is larger than 200 pixels in step S205 of FIG. 9, the size may be determined in multiple steps, and the degree of thinning may be changed in accordance with the size.

An upper limit and a lower limit may be set with respect to each of the number L1 of luminance lines to be added and the divisor L2 in accordance with a movement amount.

As described above, FIG. 9 shows a method of changing the number L1 of luminance lines to be added and the divisor L2 based on whether the main subject is a moving body; at this time, preliminary processing may be changed by, for example, using a different filter in step S306 of FIG. 10A.

In calculating a defocus amount in step S313 of FIG. 10A, posterior correction processing for enabling the imaging lens 101 to achieve a better focus on the subject may be executed, but configuration may be taken to not execute this posterior correction processing when the subject is a moving body. This posterior correction processing includes, for example, processing for calculating a correction value to be added to or subtracted from the defocus amount to achieve a better focus, and this calculation is performed using information indicating, for example, a focal length of the imaging lens 101 and information related to image capture settings, such as an f-number. Therefore, a calculation period for calculating the correction value is simply added to a calculation period for focus detection. Meanwhile, as the subject keeps moving, there is a high possibility that the position of the subject changes after calculating the correction value to achieve a better focus. Accordingly, when the subject is a moving body, calculation can be accelerated by skipping the posterior correction processing.

Although the image sensor 141 is covered by color filters composing the Bayer array in the foregoing first embodiment, the color filters are not limited to being arrayed in this manner. Furthermore, although the outputs from the photoelectric converters 30-1 and 30-2 of four pixels are cumulated in each pixel block in the foregoing first embodiment, pixel signals obtained from the photoelectric converters 30-1 and 30-2 of each pixel may be used in the foregoing focus detection control without being cumulated.

Second Embodiment

The following describes a method of setting focus detection areas according to a second embodiment of the present invention. The above-described first embodiment has presented a method of setting the number of luminance lines to be added and the divisor in a focus detection area based on whether a moving body has been detected or on the size of a subject. In contrast, the second embodiment presents a method in which, while focus detection is repeatedly performed, the number of focus detection areas and a shift range for correlation calculation are changed in accordance with an on-screen movement of a subject in an optical axis direction.

Note that in the second embodiment, configurations and contents of processing that are the same as those of the first embodiment will be given the same reference signs thereas, and a description thereof will be omitted.

Figure 12:
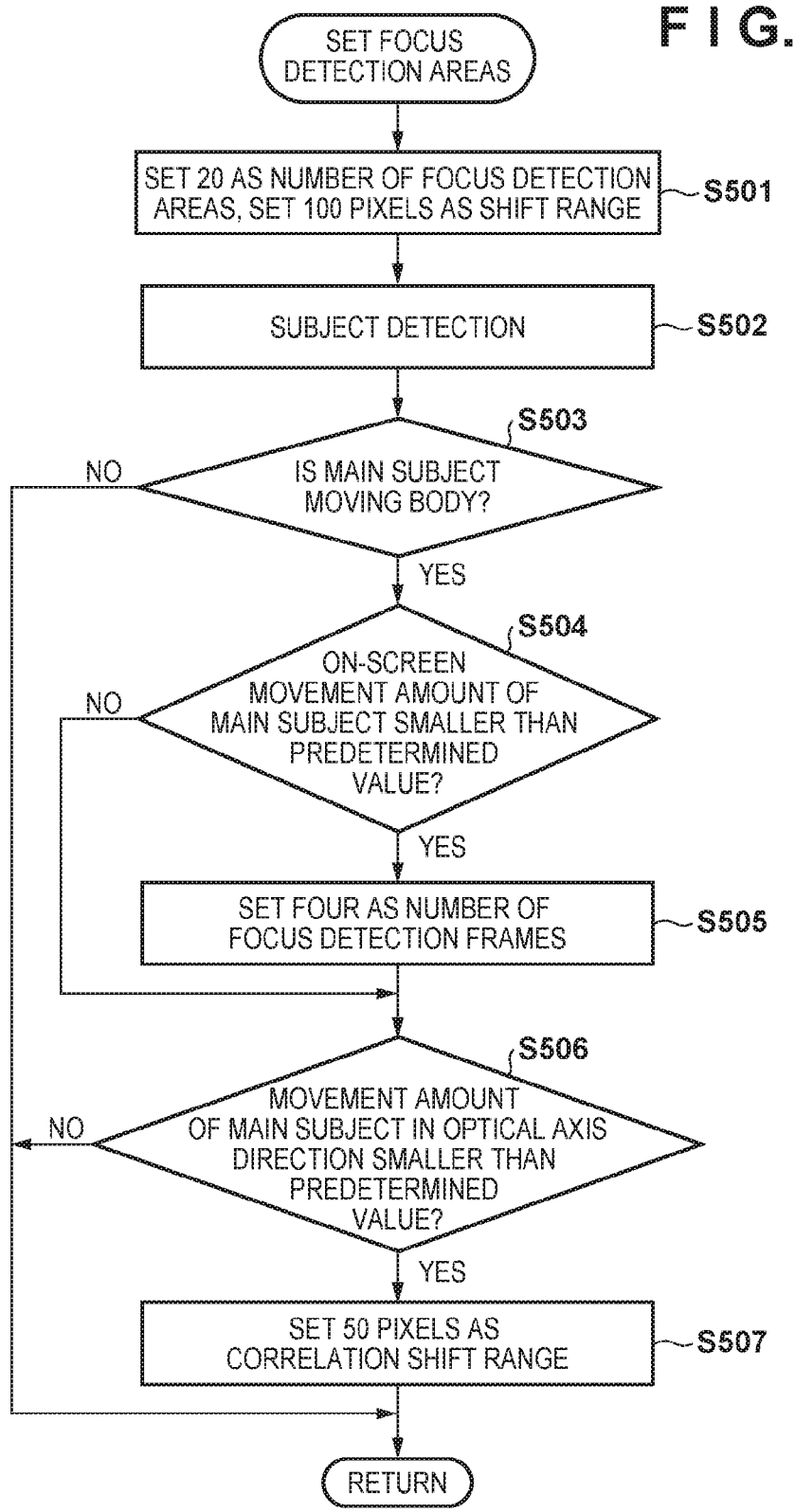
FIG. 12 is a flowchart of a method of setting focus detection areas according to a second embodiment.

A description is now given of the method of setting focus detection areas according to the second embodiment with reference to FIG. 12. Steps of FIG. 12 are executed in step S301 of FIG. 10A by the CPU 151.

First, in step S501, initial settings for the focus detection areas 71 are configured. Herein, as one example, 20 is set as an initial value of the number of focus detection areas 71 to be set. Furthermore, 100 is set as a shift range for correlation calculation (a range in which the A image signal and the B image signal in FIG. 5B are shifted to calculate correlation amounts). Next, in step S502, subject detection is performed. This subject detection is performed through subject recognition, such as facial detection, performed by the image processing unit 152.

In step S503, whether the detected subject is a moving body is determined, and if the subject is not a moving body, processing ends. On the other hand, if the subject is a moving body, processing proceeds to step S504, and whether an on-screen movement amount of a main subject is smaller than a predetermined value (second threshold, or first threshold) is determined. A difference between the results of subject recognition in the time direction is utilized in calculating the on-screen movement amount. A main subject position at the time of previous subject recognition is stored, and a main subject position at the time of current subject recognition is compared therewith. If a difference therebetween is equal to or larger than, for example, 100 pixels, the on-screen moving amount of the main subject is determined to be equal to or larger than the predetermined value; if the difference therebetween is smaller than 100 pixels, the on-screen movement amount of the main subject is determined to be smaller than the predetermined value.

If the on-screen movement amount of the main subject is equal to or larger than the predetermined value in step S504, processing proceeds to step S506. On the other hand, if the on-screen movement amount of the main subject is smaller than the predetermined value, processing proceeds to step S505, and four is set as the number of focus detection areas 71 to be set. This is because, when the on-screen movement amount of the main subject is small, the position that the subject is predicted to take next can be covered without setting many focus detection areas 71. Therefore, by reducing the number of focus detection areas 71, a calculation period for a single operation of focus detection can be reduced.

Next, in step S506, whether a movement amount of the main subject in the optical axis direction is smaller than a predetermined value (third threshold, or second threshold) is determined. Several results of focus detection from the past are referenced in calculating the movement amount in the optical axis direction. The result of previous focus detection is stored, and a main subject position at the time of current focus detection is compared therewith. Alternatively, a lens position of the focus lens 131 at the time of previous focus adjustment and a lens position thereof at the time of current focus adjustment may be compared with each other. If a difference therebetween, as a defocus amount, is equal to or larger than 3 mm, the movement amount of the main subject in the optical axis direction is determined to be equal to or larger than the predetermined value (third threshold, or second threshold); if the difference therebetween is smaller than 3 mm, the movement amount of the main subject in the optical axis direction is determined to be smaller than the predetermined value.

In step S506, if the movement amount of the main subject in the optical axis direction is equal to or larger than the predetermined value, processing ends; if the movement amount is smaller than the predetermined value, processing proceeds to step S507. In step S507, the shift range for correlation calculation in the focus detection areas 71 is set to be smaller than a range set when the movement amount is equal to or larger than the predetermined value; for example, the shift range is set to 50 pixels. This is because, when the movement amount of the main subject in the optical axis direction is small, the position that the subject is predicted to take next can be covered without setting a large shift range for correlation calculation. Therefore, by reducing the shift range for correlation calculation, a calculation period for a single operation of focus detection can be reduced.

As described above, in the present second embodiment, calculation can be accelerated by controlling the number of focus detection areas and the shift range for correlation calculation in accordance with the magnitude of a movement based on the result of determining whether a subject is a moving body. When the subject is a moving body, sampling in the time direction is enhanced by accelerated calculation; this can increase the prediction accuracy and enables focus adjustment in pursuit of the moving body.

Note that the above-described numerical values in the second embodiment serve as examples. For example, instead of setting the number of focus detection areas 71 after determining only whether the on-screen movement amount of the main subject is smaller than the predetermined value in step S504, the number of focus detection areas may be set in a stepwise manner in accordance with the movement amount.

Similarly to the above-described first embodiment, an upper limit and a lower limit may be set with respect to each of the number L1 of luminance lines to be added and the divisor L2.

Further, in the first and second embodiments, an example in which two photoelectric converters 30-1 and 30-2 are provided in each pixel is described, however, three or more photoelectric converters may be formed in each focus detection pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009979, filed on Jan. 21, 2016 which is hereby incorporated by reference herein in its entirety.

What is claimed is:

1. A focus detection apparatus that performs focus detection based on a phase difference method using signals output from an image sensor including a plurality of focus detection pixels, each focus detection pixel having a first photoelectric portion and a second photoelectric portion that share one microlens and receive light beams passing through different pupil regions of an imaging optical system, the focus detection apparatus comprising:
   a setting unit that sets one or more focus detection areas in which the focus detection is performed, such that a subject in an image formed on the image sensor is included therein;
   a detection unit that detects whether at least one of a position and a size of the subject has changed;
   a division unit that divides each of the one or more focus detection areas into a plurality of divisional areas in a preset first direction in accordance with a result of the detection by the detection unit; and
   a focus detection unit that
   for each divisional area, adds signals output from the first photoelectric portions included in the divisional area in the first direction, adds signals output from the second photoelectric portions included in the divisional area in the first direction, and obtains correlation amounts while shifting a pair of signals obtained through the addition relative to each other, and
   adds the obtained correlation amounts of the divisional areas for each focus detection area, and performs the focus detection based on a result of adding the obtained correlation amounts,
   wherein the division unit makes a divisor used in obtaining the divisional areas smaller when at least one of the position and the size of the subject has changed than when there is no change in the position and the size of the subject.

2. The focus detection apparatus according to claim 1, wherein the focus detection unit detects whether the size of the subject is larger than a preset first threshold, and if the size of the subject is larger than the first threshold, thins or adds signals output from the focus detection pixels in a second direction perpendicular to the first direction.

3. The focus detection apparatus according to claim 1, wherein if the position of the subject has changed, the setting unit makes the number of the focus detection areas to be set smaller when a movement amount of the position of the subject is smaller than a preset second threshold than when the movement amount is equal to or larger than the second threshold.

4. The focus detection apparatus according to claim 1, wherein the focus detection unit sets a range of the shifting to be smaller when a change amount of the size of the subject detected by the detection unit is smaller than a preset third threshold than when the change amount is equal to or larger than the third threshold.

5. The focus detection apparatus according to claim 1, further comprising
a conversion unit that converts a result of the focus detection by the focus detection unit into a driving amount for driving a focus lens,
wherein the conversion unit is capable of executing correction processing for correcting the driving amount using information of the imaging optical system including the focus lens, and if at least one of the position and the size of the subject has changed, does not execute the correction processing.

6. A focus detection apparatus that performs focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection apparatus comprising:
a setting unit that sets one or more focus detection areas in which the focus detection is performed, such that a subject in an image formed on the image sensor is included therein;
a detection unit that, if a position of the subject has changed, detects a movement amount of the position of the subject; and
a focus detection unit that performs the focus detection in each focus detection area based on signals output from the focus detection pixels included in the focus detection area,
wherein the setting unit makes the number of the focus detection areas to be set smaller when the movement amount of the position of the subject is smaller than a preset first threshold than when the movement amount is equal to or larger than the first threshold.

7. The focus detection apparatus according to claim 6, wherein
the focus detection unit performs the focus detection by obtaining correlation amounts while shifting signals output from the plurality of photoelectric portions relative to each other,
the detection unit further detects whether a size of the subject has changed, and
a range of the shifting is set to be smaller when a change amount of the size of the subject detected by the detection unit is smaller than a preset second threshold than when the change amount is equal to or larger than the second threshold.

8. The focus detection apparatus according to claim 6, further comprising
a conversion unit that converts a result of the focus detection by the focus detection unit into a driving amount for driving a focus lens,
wherein the conversion unit is capable of executing correction processing for correcting the driving amount using information of the imaging optical system including the focus lens, and if at least one of the position and the size of the subject has changed, does not execute the correction processing.

9. A focus detection apparatus that performs focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection apparatus comprising:
a setting unit that sets one or more focus detection areas in which the focus detection is performed, such that a subject in an image formed on the image sensor is included therein;
a detection unit that detects whether a size of the subject has changed; and
a focus detection unit that performs the focus detection in each focus detection area by obtaining correlation amounts while shifting signals output from the plurality of photoelectric portions relative to each other,
wherein the focus detection unit sets a range of the shifting to be smaller when a change amount of the size of the subject detected by the detection unit is smaller than a preset threshold than when the change amount is equal to or larger than the threshold.

10. An image capturing apparatus, comprising:
an image sensor including a plurality of focus detection pixels, each focus detection pixel having a first photoelectric portion and a second photoelectric portion that share one microlens and receive light beams passing through different pupil regions of an imaging optical system; and
a focus detection apparatus that performs focus detection based on a phase difference method using signals output from the image sensor, the focus detection apparatus comprising:
a setting unit that sets one or more focus detection areas in which the focus detection is performed, such that a subject in an image formed on the image sensor is included therein;
a detection unit that detects whether at least one of a position and a size of the subject has changed;
a division unit that divides each of the one or more focus detection areas into a plurality of divisional areas in a preset first direction in accordance with a result of the detection by the detection unit; and
a focus detection unit that
for each divisional area, adds signals output from the first photoelectric portions included in the divisional area in the first direction, adds signals output from the second photoelectric portions included in the divisional area in the first direction, and obtains correlation amounts while shifting a pair of signals obtained through the addition relative to each other, and
adds the obtained correlation amounts of the divisional areas for each focus detection area, and performs the focus detection based on a result of adding the obtained correlation amounts, wherein the division unit makes a divisor used in obtaining the divisional areas smaller when at least one of the position and the size of the subject has changed than when there is no change in the position and the size of the subject.

11. An image capturing apparatus, comprising:
an image sensor including a plurality of focus detection pixels, each focus detection pixel having a plurality of photoelectric portions that share one microlens and receive light beams passing through different pupil regions of an imaging optical system; and
a focus detection apparatus that performs focus detection based on a phase difference method using signals output from the image sensor, the focus detection apparatus comprising:
  a setting unit that sets one or more focus detection areas in which the focus detection is performed, such that a subject in an image formed on the image sensor is included therein;
  a detection unit that, if a position of the subject has changed, detects a movement amount of the position of the subject; and
  a focus detection unit that performs the focus detection in each focus detection area based on signals output from the focus detection pixels included in the focus detection area,
  wherein the setting unit makes the number of the focus detection areas to be set smaller when the movement amount of the position of the subject is smaller than a preset first threshold than when the movement amount is equal to or larger than the first threshold.

12. An image capturing apparatus, comprising:
the image sensor including a plurality of focus detection pixels, each focus detection pixel having a plurality of photoelectric portions that share one microlens and receive light beams passing through different pupil regions of an imaging optical system; and
a focus detection apparatus that performs focus detection based on a phase difference method using signals output from an image sensor, the focus detection apparatus comprising:
  a setting unit that sets one or more focus detection areas in which the focus detection is performed, such that a subject in an image formed on the image sensor is included therein;
  a detection unit that detects whether a size of the subject has changed; and
  a focus detection unit that performs the focus detection in each focus detection area by obtaining correlation amounts while shifting signals output from the plurality of photoelectric portions relative to each other,
  wherein the focus detection unit sets a range of the shifting to be smaller when a change amount of the size of the subject detected by the detection unit is smaller than a preset threshold than when the change amount is equal to or larger than the threshold.

13. A focus detection method for performing focus detection based on a phase difference method using signals output from an image sensor including a plurality of focus detection pixels, each focus detection pixel having a first photoelectric portion and a second photoelectric portion that share one microlens and receive light beams passing through different pupil regions of an imaging optical system, the focus detection method comprising:
setting one or more focus detection areas in which the focus detection is performed, such that a subject in an image formed on the image sensor is included therein;
detecting whether at least one of a position and a size of the subject has changed;
dividing each of the one or more focus detection areas into a plurality of divisional areas in a preset first direction in accordance with a result of the detection;
for each divisional area, adding signals output from the first photoelectric portions included in the divisional area in the first direction, and adding signals output from the second photoelectric portions included in the divisional area in the first direction;
for each divisional area, obtaining correlation amounts while shifting a pair of signals obtained through the addition relative to each other;
for each focus detection area, adding the obtained correlation amounts of the divisional areas; and
performing the focus detection based on a result of adding the obtained correlation amounts, wherein
in the dividing, a divisor used in obtaining the divisional areas is made smaller when at least one of the position and the size of the subject has changed than when there is no change in the position and the size of the subject.

14. A focus detection method for performing focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection method comprising:
setting one or more focus detection areas in which the focus detection is performed, such that a subject in an image formed on the image sensor is included therein;
if a position of the subject has changed, detecting a movement amount of the position of the subject; and
performing the focus detection in each focus detection area based on signals output from the focus detection pixels included in the focus detection area, wherein
in the setting, the number of the focus detection areas to be set is made smaller when the movement amount of the position of the subject is smaller than a preset first threshold than when the movement amount is equal to or larger than the first threshold.

15. A focus detection method for performing focus detection based on a phase difference method using signals output from an image sensor including a plurality of focus detection pixels, each focus detection pixel having a plurality of photoelectric portions that share one microlens and receive light beams passing through different pupil regions of an imaging optical system, the focus detection method comprising:
setting one or more focus detection areas in which the focus detection is performed, such that a subject in an image formed on the image sensor is included therein;
detecting whether a size of the subject has changed; and
performing the focus detection in each focus detection area by obtaining correlation amounts while shifting signals output from the plurality of photoelectric portions relative to each other, wherein
in the performing of the focus detection, a range of the shifting is set to be smaller when a change amount of the size of the subject detected is smaller than a preset threshold than when the change amount is equal to or larger than the threshold.

* * * * *